US010359299B2

(12) United States Patent
Liu et al.

(10) Patent No.: US 10,359,299 B2
(45) Date of Patent: Jul. 23, 2019

(54) ELECTRIC FIELD TYPE TIME-GRATING ANGULAR DISPLACEMENT SENSORS

(71) Applicant: Chongqing University of Technology, Chongqing (CN)

(72) Inventors: Xiaokang Liu, Chongqing (CN); Donglin Peng, Chongqing (CN); Zhicheng Yu, Chongqing (CN)

(73) Assignee: Chongqing University of Technology, Chongqing (CN)

( * ) Notice: Subject to any disclaimer, the term of this patent is extended or adjusted under 35 U.S.C. 154(b) by 434 days.

(21) Appl. No.: 15/228,810

(22) Filed: Aug. 4, 2016

(65) Prior Publication Data

US 2017/0003146 A1    Jan. 5, 2017

Related U.S. Application Data

(63) Continuation of application No. PCT/CN2014/083215, filed on Jul. 29, 2014.

(30) Foreign Application Priority Data

May 9, 2014    (CN) .......................... 2014 1 0196685

(51) Int. Cl.
    *G01D 5/241*    (2006.01)
    *G01B 7/30*     (2006.01)
    *G01D 5/243*    (2006.01)

(52) U.S. Cl.
    CPC .............. *G01D 5/241* (2013.01); *G01B 7/30* (2013.01); *G01D 5/243* (2013.01)

(58) Field of Classification Search
    CPC ........ G01D 5/20; G01D 5/204; G01D 5/2053; G01D 5/2086; G01D 5/2258; G01D 5/241; G01D 5/2415; G01D 5/2412; G01D 5/243; G01D 5/2451
    USPC ....................... 324/207.11–207.26, 658, 660
    See application file for complete search history.

(56) References Cited

U.S. PATENT DOCUMENTS

| | | | | |
|---|---|---|---|---|
| 4,459,702 A | * | 7/1984 | Medwin | G01D 5/2415 324/725 |
| 4,633,249 A | * | 12/1986 | Sasaki | G01D 5/2415 324/725 |
| 4,743,838 A | * | 5/1988 | Eckerle | G01D 5/2415 324/660 |

(Continued)

FOREIGN PATENT DOCUMENTS

| | | |
|---|---|---|
| CN | 1869594 A | 11/2006 |
| CN | 2869768 Y | 2/2007 |

(Continued)

OTHER PUBLICATIONS

International Search Report, Application No. PCT/CN2014/083125, dated Dec. 31, 2014, 5 pages.

(Continued)

*Primary Examiner* — Jeff W Natalini
*Assistant Examiner* — Steven L Yeninas
(74) *Attorney, Agent, or Firm* — JCIPRNET

(57) ABSTRACT

An electric field type time-grating angular displacement sensor, including a rotor and a stator. The rotor includes m rotor electrodes. The rotor electrodes cover a circle on a surface of a rotor body with equal space. The stator includes 4m stator electrodes. The stator electrodes cover a circle on a surface of a stator body with equal space.

6 Claims, 4 Drawing Sheets

(56) References Cited

U.S. PATENT DOCUMENTS

| | | | | |
|---|---|---|---|---|
| 4,788,546 | A | * 11/1988 | Sasaki | G01D 5/243 324/660 |
| 4,879,508 | A | * 11/1989 | Andermo | G01B 7/003 324/690 |
| 5,068,653 | A | * 11/1991 | Klingler | G01B 7/02 324/161 |
| 6,492,911 | B1 | * 12/2002 | Netzer | G01D 5/2415 318/662 |
| 6,525,546 | B1 | * 2/2003 | Zhao | G01B 7/003 324/658 |
| 9,250,058 | B2 | * 2/2016 | Backes | G01B 7/30 |
| 9,714,846 | B2 | * 7/2017 | Baxter | G01D 5/2412 |
| 2005/0092108 | A1 | * 5/2005 | Andermo | G01D 5/2415 73/862.626 |
| 2010/0148802 | A1 | * 6/2010 | Uchida | G01D 5/2415 324/661 |

FOREIGN PATENT DOCUMENTS

| | | |
|---|---|---|
| CN | 101556138 A | 10/2009 |
| CN | 102288100 | 12/2011 |
| CN | 102425987 A | 4/2012 |
| CN | 103591896 A | 2/2014 |
| CN | 103822571 A | 5/2014 |
| EP | 1596203 A1 | 11/2005 |
| JP | 08278105 | 10/1996 |
| JP | 08327306 | 12/1996 |
| JP | 2009047547 A | 3/2009 |
| JP | 2013205407 A | 10/2013 |
| WO | WO 2015/078301 A1 | 6/2015 |
| WO | WO 2015/139403 A1 | 9/2015 |
| WO | WO 2015/168992 A1 | 11/2015 |

OTHER PUBLICATIONS

International Search Report, Application No. PCT/CN2014/090968, dated Jan. 21, 2015, 4 pages.
International Search Report, Application No. PCT/CN2014/083215, dated Jan. 28, 2015, 4 pages.
International Search Report for PCT/CN2014/090968, dated Jan. 21, 2015, 4 pages.
English translation of International Search Report for PCT/CN2014/090968, dated Jan. 21, 2 pages.

* cited by examiner

ELECTRIC FIELD TYPE TIME-GRATING ANGULAR DISPLACEMENT SENSORS

RELATED APPLICATIONS

This application is a continuation of copending International Application No.: PCT/CN2014/083215, filed Jul. 29, 2014, which is in incorporated herein by reference in its entirety, and additionally claims priority to Chinese Application No.: 201410196685.1, filed May 9, 2014, which is also incorporated herein by reference in its entirety.

TECHNICAL FIELD

The present invention relates to sensors for precision angular displacement measurement.

BACKGROUND ART

In the technical fields of precision angular displacement measurement, in recent years, a new type of time-grating sensor has been developed in China. This time-grating sensor uses a clock pulse as the reference for displacement measurements. And based on the foregoing, a time-grating angular displacement sensor based on alternating electric field has been further developed. The patent application document for this sensor has been published on Apr. 25, 2012 with its Title of Invention as "Time-grating angular displacement sensors based on alternating electric field" and patent number: CN102425987A.

The foregoing time-grating angular displacement sensors based on alternating electric field has adopted a differential capacitance with a single layer structure as its signal coupling channel. In addition, two channels of standing wave signals have been induced by two circles of electrodes, and then the two channels of standing wave signals are combined into one channels of traveling wave signal by an adding circuit. However, due to the reason that the length-width ratios of the two circles of electrodes disposed at cylindrical end surface are not the same, and accordingly the varying patterns of the corresponding two channels of standing wave signals are not the same as well, the signals of the two circles of electrodes may interfere with each other, which could lead to an increase of measurement errors, and thus hinder further improvements in its measurement precision. On the other hand, concerning its manufacturing process, it is difficult to ensure a consistency between the two circles of electrodes; in addition, concerning its installation, it is difficult to ensure the consistent of electric field coupling strengths between the two circles of electrodes as well. As a result, the foregoing issues may result in an inconsistency in amplitude of the generated two channels of standing wave signals, which will lead to measurement errors and thus compromise its applications in industrial field.

SUMMARY OF INVENTION

The objective of the present invention is to solve the above mentioned deficiencies of the existing technologies, and provide an electric field time-grating angular displacement sensor based on a single circle multilayer structure. It employs the electrodes based on a single circle multilayer structure, which are able to solve the problems of interferences between the signals of the two circles of electrodes and the inconsistency between length-width ratios of the two circles of electrode, avoid the problems of inconsistency between the two circles of electrodes resulting from manufacturing or installing. In addition, it is able to directly obtain the traveling wave signal based on electric field coupling mechanism without an adding circuit. In this way, it can reduce measurement errors, lower the requirements for installation accuracy, as well as simplify system structure.

The technical solution of the present invention is as follows:

An electric field time-grating angular displacement sensor based on a single circle multilayer structure, comprising two parts, namely a rotor and a stator, wherein the rotor body and the stator body can be implemented in two different ways, cylinder and cylindrical ring.

In the first way of implementation for the sensor of the present invention, an upper end surface and a lower end surface of a cylinder or cylindrical ring have been used to dispose the electrodes. Both the rotor body and the stator body adopt the form of cylinder or cylindrical ring. A lower end surface (i.e. the cylindrical end surface) of the rotor body is covered by the rotor electrodes in a double sinusoidal shape formed by two vertically symmetrical sinusoidal shapes (which is the shape formed along the circumferential direction). The number of rotor electrodes is m, which have been equally distributed in a circle. The rotor electrodes are connected by leads. In addition, an upper surface of the stator body (i.e. the cylindrical end surface) is sequentially covered by four layers of medium films. The first layer is a metal film, which has been processed into 4 excitation signal leads. The second layer is an insulation film; the third layer is also a metal layer, which has been processed into the stator electrodes in an annular sector shape (i.e. it will be in a rectangular shape when spread along the circumferential direction). The stator electrodes are in the same size. In addition, two neighboring electrodes have been maintained with an insulation distance there between. The number of stator electrodes is 4m, which have been equally distributed in a circle. The fourth layer is an insulation protection film. The four excitation signal leads are routed below the middle of the stator electrodes, and the area of the four excitation signal leads of the stator electrodes can be completely covered by the facing leads of the rotor electrodes. The rotor body and the stator body have been co-axially installed. In addition, the lower surface of the rotor body and the upper surface of the stator body are arranged in face-to-face parallel position. Accordingly, the rotor electrodes and the stator electrodes are directly facing each other with a space $\delta$ there between, so as to form a coupled capacitor.

In the second way of implementation for the sensor of the present invention, an outer cylindrical surface and an inner cylindrical surface of a cylinder or cylindrical ring have been used to dispose the electrodes. In this case, the rotor body adopts the form of cylinder. An outer cylindrical surface of the rotor body has rotor electrodes in a double sinusoidal shape formed by two vertically symmetrical sinusoidal shapes (the shape formed along the circumferential direction). The number of rotor electrodes is m, which have been equally distributed in a circle. The rotor electrodes are connected by leads. The stator adopts the form of cylindrical ring. An inner cylindrical surface of the stator body is sequentially covered by four layers of medium films. The first layer is a metal film, which has been processed into 4 excitation signal leads. The second layer is an insulation film; the third layer is also a metal layer, which has been processed into the stator electrodes, which are in a shape of curved surface rectangle (i.e. it will be in a rectangular shape when spread along the circumferential direction). The stator electrodes are same in size. In addition, two neighboring electrodes have been maintained with an insulation distance there between. The number of stator electrodes is 4m, which have been equally distributed in a circle. The fourth layer is an insulation protection film. The rotor body and the stator body have been co-axially installed. In addition, the rotor electrodes and the stator electrodes are directly facing each other with a space δ there between, so as to form a coupled capacitor.

In the two structures described above, the number of the rotor electrodes is m. In addition, the length of a rotor electrode is slightly shorter than that of a stator electrode, while the width of one rotor electrode is equal to a sum of the width of one stator and an insulation distance. Moreover, the space between two neighboring rotor electrodes is equal to 3 times of the width of a rotor electrode. More specifically, the shape of the rotor electrode is formed by the area defined by the sine curve within the region [0, π] and the x-axis and the area defined by the sine curve within the region [π, 2π], and the-x-axis. In this way, a coupled capacitor, whose directly overlapping area changing on sine manner has been obtained. Thus, the modulated angular displacement signal is then achieved as well.

The number of stator electrodes is 4m. The 4n+1 order of the stator electrodes are connected to one group, where n=0, 1, 2, 3 . . . m−1, to form an excitation group A, the 4n+2 order of the stator electrodes are connected to one group to form an excitation phase B, the 4n+3 electrodes of the stator electrodes are connected to one group to form an excitation group C, and the 4n+4 order of the stator electrodes are connected to one group to form an excitation group D. In addition, four sinusoid excitation signals $U_a$, $U_b$, $U_c$ and $U_d$ with the same amplitude and same frequency at phase difference of 90 degrees sequentially are applied to the four excitation groups of A, B, C and D of the stator respectively, so as to generate a channel of traveling wave signal $U_o$ at the rotor electrodes. The foregoing channel of traveling wave signal and a channel of reference signal $U_r$ with the same frequency and fixed phase undergo a shaping process through a shaping circuit and a phase comparison profess through a phase comparison circuit. The phase difference between the foregoing two channels of signals is represented by the number of interpolated high frequency clock pulses, which then undergoes a scale transformation, so as to obtain the angular displacement between the rotor body and the stator body. The four excitation signals $U_a$, $U_b$, $U_c$, $U_d$ and the one channel of reference signal $U_r$ with the same frequency are generated by digital wave synthesis technology.

When the relative rotation occurs between the rotor body and the stator body, the relative overlapping areas between the rotor electrodes and the electrodes of the four excitation groups A, B, C and D of the stator changes periodically from zero to small, from small to large, from large to small and from small to zero. As a result, the capacitance values undergo periodical changes as well. The stator electrodes of excitation group A and the corresponding rotor electrodes form a coupled capacitor $C_1$; the stator electrodes of the excitation group B and the corresponding rotor electrodes form a coupled capacitor $C_2$; the stator electrodes of the excitation group C and the corresponding rotor electrodes form a coupled capacitor $C_3$; and the stator electrodes of the excitation group D and the corresponding rotor electrodes form a coupled capacitor $C_4$. Two members and the other two members of the four coupled capacitors $C_1$, $C_2$, $C_3$, and $C_4$ work in an alternative way, wherein when two of the four capacitors work, the other two capacitors have capacitance value of zero. The rotor electrodes output the traveling wave signal $U_o$. Further, the foregoing traveling wave signal $U_o$ and the reference signal $U_r$ with the same frequency undergo a shaping process to transform two channels of square waves, which then undergo a phase comparison process. The phase difference between the foregoing two channels of signals is represented by the number of interpolated high frequency clock pulse, which then undergoes a scale transformation, so as to obtain the angular displacement between the rotor body and the stator body.

The technical solution of the present invention employs a new approach of electric field coupling based on a single circle multilayer structure to form electric traveling waves directly. It has combined different advantages from a variety of different types displacement sensors based on traditional spatial subdivision technology.

The present invention offers the following benefits: it employs the stator with multilayer structure to construct a single circle coupled electric field for the measurements. In addition, the sensor rotor electrodes in single circle sinusoid shape are used to directly induce electric traveling waves; and the high frequency clock pulse are employed as displacement measurement reference. As a result, the sensor provided in the present invention has the advantages including low power consumption, high precision, simple structure, low requirements for mechanical installation accuracy, and good stability in industrial applications.

DESCRIPTION OF EMBODIMENTS

The present invention will be further described in reference to the accompanying drawings.

As shown in FIG. 1(a), FIG. 1(b), FIG. 2(a), FIG. 2(b) and FIG. 3, the sensor according to the present invention comprises two parts, namely a rotor body 1 and a stator body 2. The foregoing two bodies are formed by a ceramic material; and a surface of ceramic has been sprayed with a layer of iron nickel alloy as the electrodes. The present invention has two embodiments.

Figure 1:
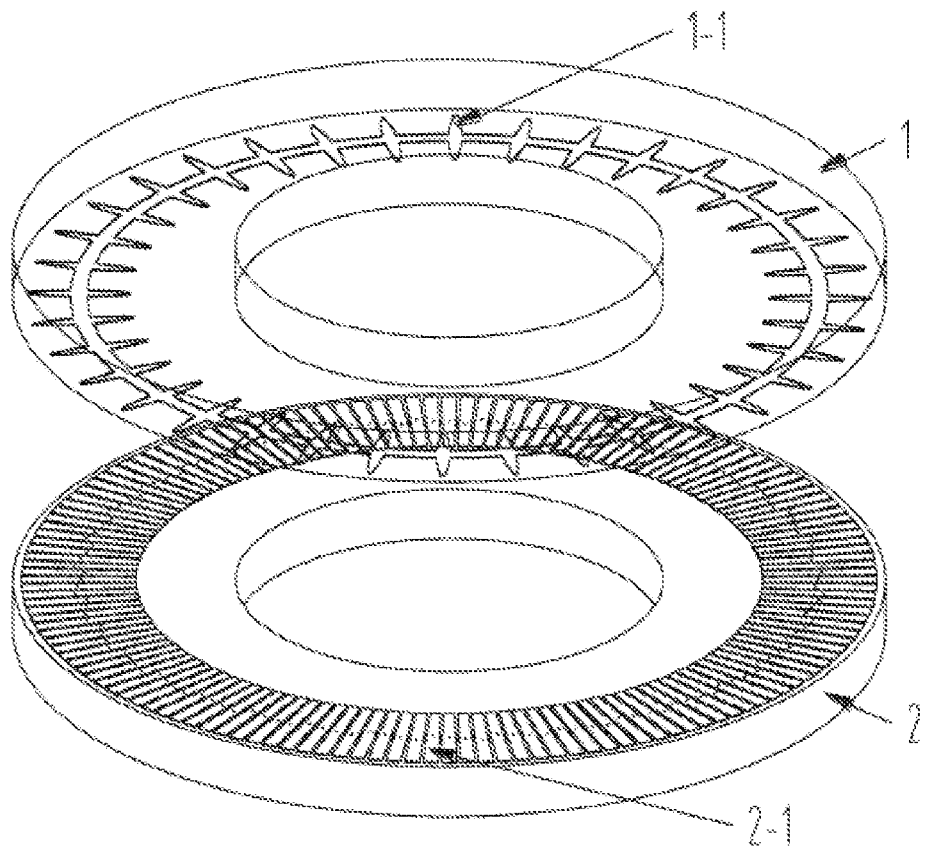
FIGS. 1(a) and 1(b) are schematic views of the first type structure of the sensor for the present invention, wherein its electrodes are disposed on the cylindrical end surfaces of the stator body and the rotor body.
Figure 1:
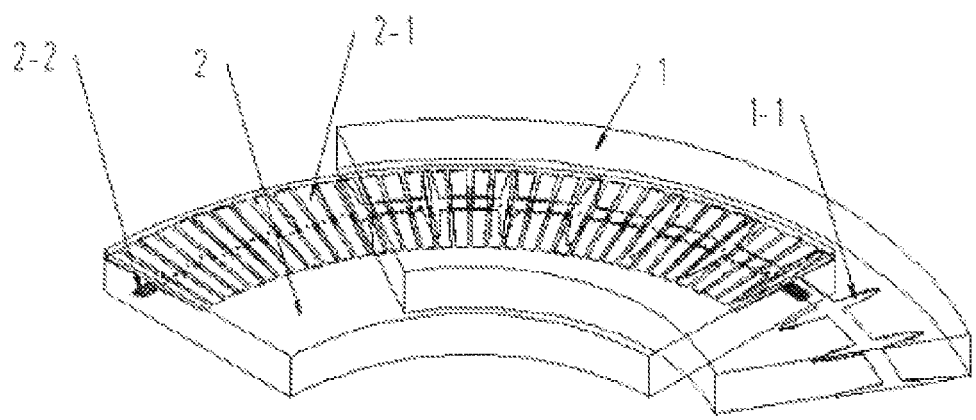

For the first type of structure, please refer to FIG. 1(a) and FIG. 1(b): the lower cylindrical end surface of the rotor body 1 is covered by the rotor electrodes 1-1 in same size and shape along the circumferential direction with equal space therebetween. There are 36 rotor electrodes in total. The shape of rotor electrode is a double sinusoidal shape formed by two vertically symmetrical sinusoidal shapes when it is spread along the circumferential direction. The foregoing rotor electrodes have been connected by a lead with a width of 1.8 mm. Moreover, the two vertexes of the double sinusoidal shaped electrode are respectively located on a circumference with a radius of 37.2 mm and a circumference with a radius of 49 mm, respectively. The central angle corresponding to the widest part of each electrode is 2.5 degrees. Further, a cylindrical upper end surface of the stator body is sequentially covered by four layers of medium films. The first layer is a metal film. The second layer is an insulation film. The third layer is a metal layer. The fourth layer is an insulation protection film. The first layer of metal film includes 4 flat circular leads, namely the excitation leads 2-2, which connects each one of the four excitation groups of A, B, C and D of the stator into one group. The third layer of metal film is a circle of annular sector shaped electrodes with the same radial height and the same central angle, namely the stator electrodes 2-1. There are 144 stator electrodes in total. For each electrode, its inner radius is 36.2 mm, while its outer radius is 50 mm, and central angle is 2.4 degrees. The space between two neighboring electrodes for the insulation is 0.1 degrees. The rotor body and the stator body have been co-axially installed. In addition, the lower end surface of the rotor body 1 and the upper end surface of the stator body 2 are arranged in parallel position. Accordingly, the rotor electrodes 1-1 and the stator electrodes 2-1 are directly facing each other with a space δ=0.5 mm therebetween, and the shape thereof when spread along the circumferential direction is a rectangle.

Figure 2:
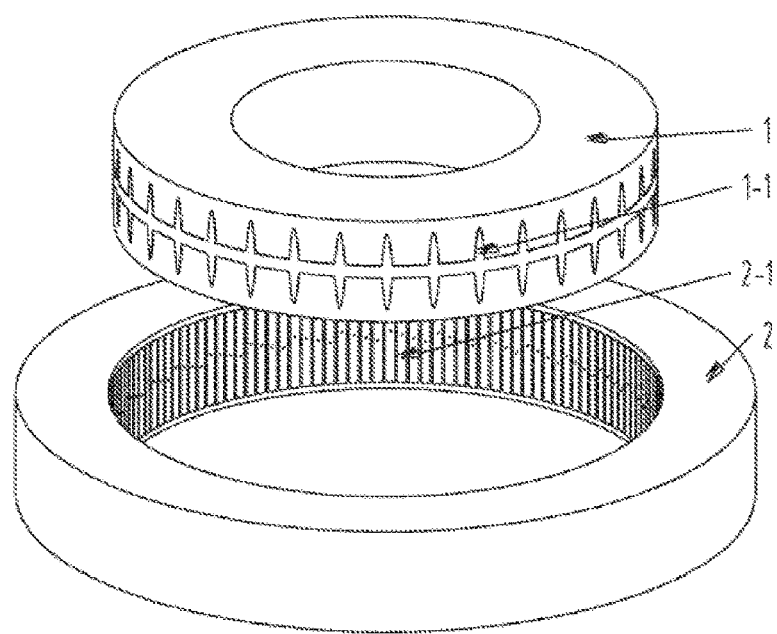
FIGS. 2(a) and 2(b) are schematic views of the second type structure of the sensor for the present invention, wherein its electrodes are disposed on the cylindrical surfaces of the stator body and the rotor body.
Figure 2:
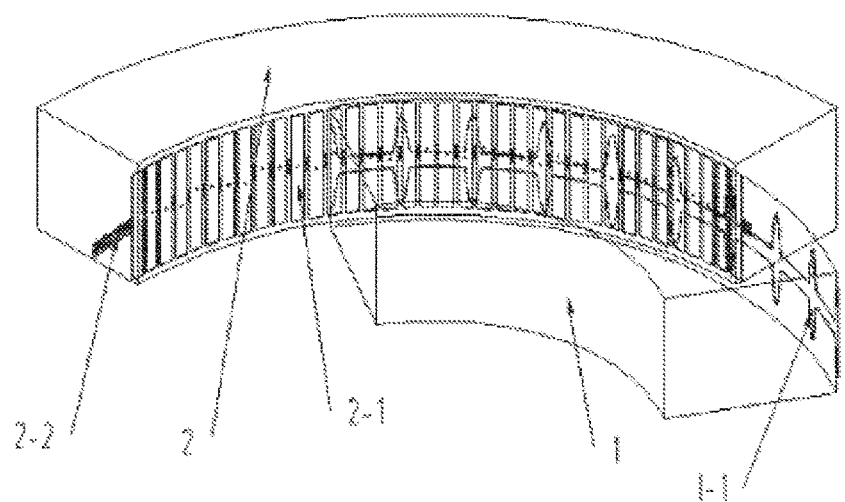
Figure 3:
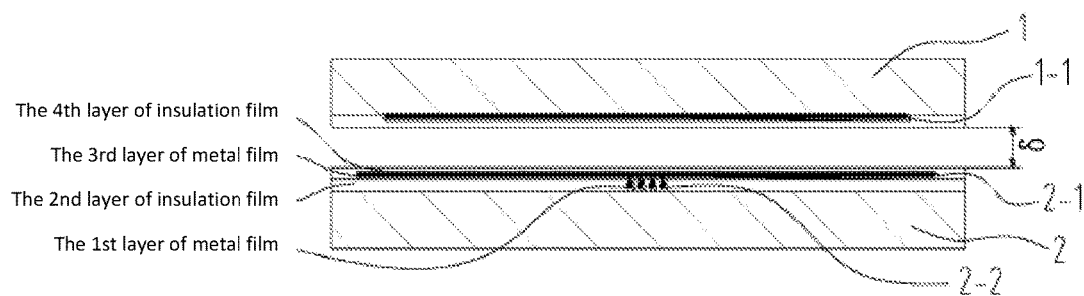
FIG. 3 is a schematic view showing the electrodes position relationship between the stator body and the rotor body.
Figure 4:
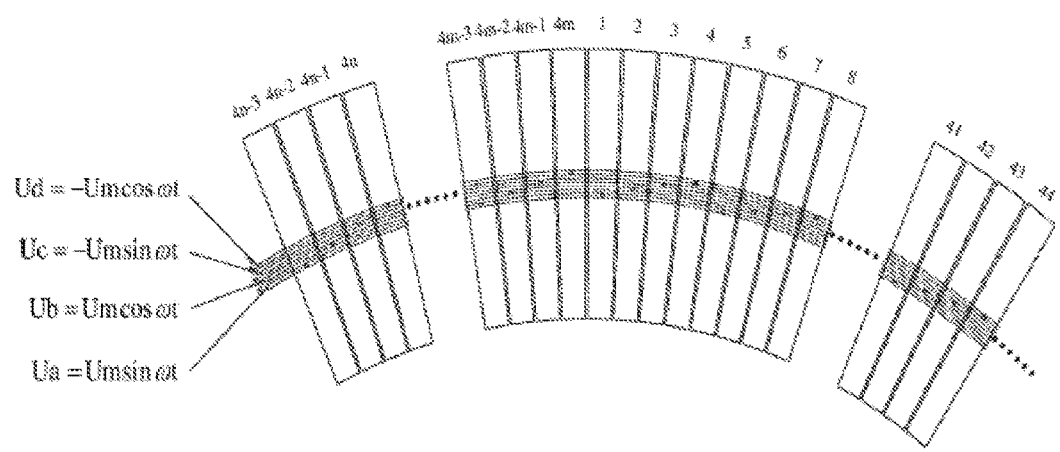
FIG. 4 is a diagram of signal connection relationship of the stator electrodes.

For the second type of structure, please refer to FIG. 2(*a*) and FIG. 2(*b*): the outer cylindrical surface of the rotor body 1 is covered by the rotor electrodes 1-1 in same size and shape along the circumferential direction with equal space therebetween. There are 36 rotor electrodes in total. The outer circular radius of the rotor body is 44.5 mm. The height of the rotor electrode along cylindrical axis is 11.8 mm. The central angle of each electrode along cylindrical radial direction is 2.5 degrees. The shape of rotor electrode is a double sinusoidal shape formed by two vertically symmetrical sinusoidal shapes when it is spread along the circumferential direction. The foregoing rotor electrodes have been connected by a lead with a width of 1.8 mm. Further, the inner cylindrical surface of the cylindrical ring of the stator body is sequentially covered by four layers of medium films. The first layer is a metal film. The second layer is an insulation film. The third layer is a metal layer. The fourth layer is an insulation protection film. The first layer of metal film includes 4 circular leads, namely the excitation leads 2-2, which connects each one of the four excitation groups of A, B, C and D of the stator into one group. The third layer of metal film is a circle of curved surface rectangular electrodes with the same height and the same width, namely the stator electrodes 2-1. There are 144 stator electrodes in total. The inner circular radius of the stator body is 45 mm, the electrode height along cylindrical axis is 13.8 mm, and the central angle is of each electrode along cylindrical radial direction is 2.4 degrees. The insulation space between two neighboring electrodes is 0.1 degrees. The rotor body and the stator body have been co-axially installed. In addition, the rotor electrodes 1-1 and the stator electrodes 2-1 are directly facing each other with a space δ=0.5 mm there between.

In the two embodiments described above, the length of a rotor electrode is slightly shorter than that of a stator electrode, while the width of one rotor electrode is equal to a sum of the width of one stator and an insulation distance. Moreover, the space between two neighboring rotor electrodes is equal to 3 times of the width of rotor electrode. The No. 1, 5, 9 . . . 141 electrodes among the stator electrodes are connected together by one excitation signal lead 2-2 to become a group, which thus forms an excitation group A, and an excitation signal $U_a=U_m \sin \omega t$ has been added to the excitation group A; the No. 2, 6, 10 . . . 142 electrodes among the stator electrodes are connected together by one excitation signal lead 2-2 to become a group, which thus forms an excitation group B, and an excitation signal $U_b=U_m \cos \omega t$ has been added to the excitation group B; the No. 3, 7, 11 . . . 143 electrodes among the stator electrodes are connected together by one excitation signal lead 2-2 to become a group, which thus forms an excitation phase C, and an excitation signal $U_c=-U_m \sin \omega t$ has been added to the excitation group C; and the No. 4, 8, 12 . . . 144 electrodes among the stator electrodes are connected together by one excitation signal lead 2-2 to become a group, which thus forms an excitation group D, and an excitation signal $U_d=-U_m \cos \omega t$ has been added to the excitation group D. In addition, the excitation signal peak value $U_m=5V$, frequency f=40 KHz, angular frequency $\omega=2\pi f=8\times 10^4 \pi$.

Figure 5:
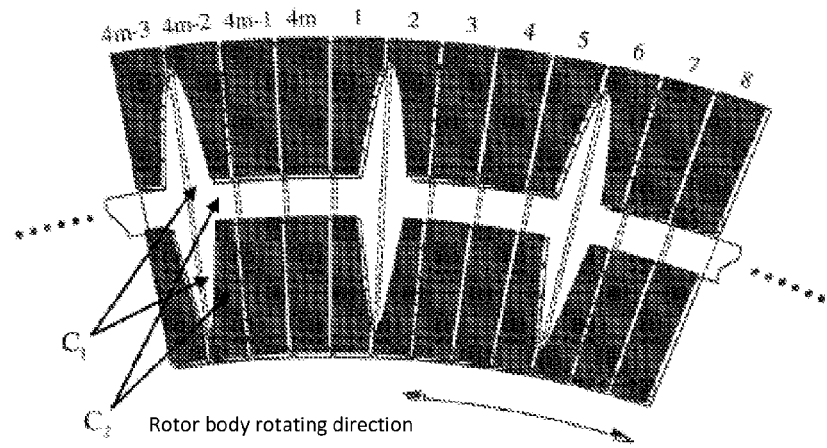
FIG. 5 is a schematic view of the coupled capacitor formed by the rotor electrodes and the stator electrodes.
Figure 6:
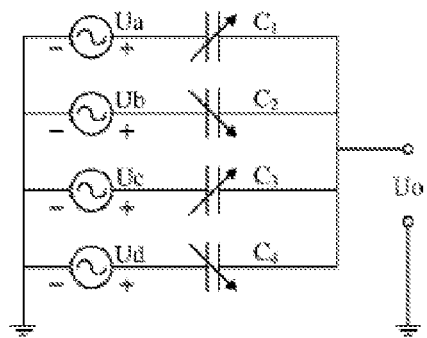
FIG. 6 is a schematic view of the circuit model of the present invention.

As shown in FIGS. 5 and 6, the rotor electrodes 1-1 and the electrodes of the excitation group A of the stator body form a coupled capacitor $C_1$; the rotor electrodes 1-1 and the electrodes of the excitation group B of the stator body form a coupled capacitor $C_2$; the rotor electrodes 1-1 and the electrodes of the excitation group C of the stator body form a coupled capacitor $C_3$; and the rotor electrodes 1-1 and the electrodes of the excitation group D of the stator body form a coupled capacitor $C_4$. In addition, when the rotor body 1 rotates clockwise, the relative overlapping area of the $C_1$ capacitor changes from large to small; the relative overlapping area of the $C_2$ capacitor changes from small to large; with the rotating angular displacement of the rotor body equal to the angle of one rotor electrode, the relative overlapping area of the $C_1$ capacitor becomes zero, the relative overlapping area of the $C_2$ capacitor starts to change from large to small, and the relative overlapping area of the $C_3$ capacitor changes from small to large. Moreover, after the rotor body has rotated in the same direction for another angle of rotor electrode, the relative overlapping area of the $C_2$ capacitor becomes zero, the relative overlapping area of the $C_3$ capacitor starts to change from large to small, and the relative overlapping area of the $C_4$ capacitor changes from small to large. Further, after the rotor body has moved in the same direction for another angle of rotor electrode, the relative overlapping area of the $C_3$ capacitor becomes zero, the relative overlapping area of the $C_4$ capacitor starts to change from large to small, and the relative overlapping area of the $C_1$ capacitor changes from small to large. In this way, it has completed one cycle of mechanical movement; and accordingly, the capacitance values of the four coupled capacitors $C_1$, $C_2$, $C_3$, and $C_4$ exhibit a cycle of periodical changes as well. The output traveling wave signal $U_o$ of the rotor electrode has the expression of first harmonic as follows:

$$U_o=K_e U_m \sin(\omega t+\pi x/W) \qquad (1)$$

Where $K_e$ is electric field coupling coefficient, x is the relative angular displacement between the rotor body and the stator body, W is a distance of 4 times of width of rotor electrode.

Figure 7:
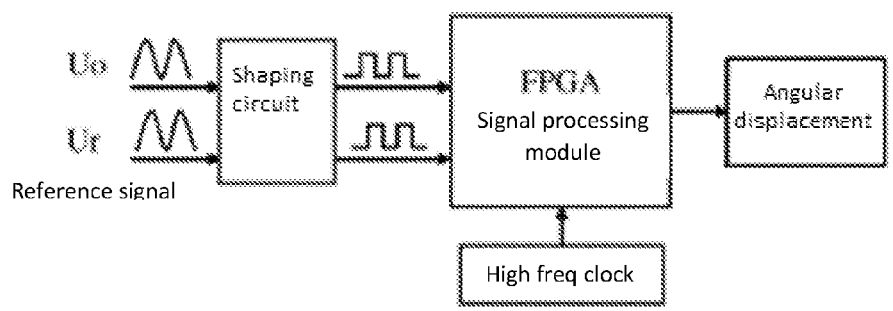
FIG. 7 is a block diagram of the signal processing of the present invention.

As shown in FIG. 7, the induced sine traveling wave signal $U_o$ and a channel of reference signal $U_r$ with the same frequency and fixed phase are sent to a shaping circuit for processing, which are then transformed into two channels of square signals with the same frequency, and then sent to a phase comparison circuit for further processing. The phase difference of the forgoing two channels of signals is obtained through an interpolated high frequency clock pulse technology. The angular displacement of the sensor rotor body relative to the sensor stator body is finally obtained through further calculation and processing.

What is claimed is:

1. An electric field type time-grating angular displacement sensor, comprising:
   a rotor; and
   a stator;
   wherein the rotor comprises m rotor electrodes, the rotor electrodes cover a circle on a surface of a rotor body with equal space;
   wherein the stator comprises 4m stator electrodes, the stator electrodes cover a circle on a surface of a stator body with equal space;
   wherein the 4n+1 order of the stator electrodes are connected to one group to form an excitation group A, the 4n+2 order of the stator electrodes are connected to one group to form an excitation group B, the 4n+3 order of the stator electrodes are connected to one group to form an excitation group C, and the 4n+4 order of the stator electrodes are connected to one group to form an excitation group D, wherein n=0, 1, 2, 3 . . . m−1;
   wherein the four excitation groups of A, B, C and D of the stator body are respectively connected to four sinusoid excitation signals Ua, Ub, Uc and Ud with the same amplitude and same frequency at phase difference of 90 degrees sequentially;
   wherein the rotor body and the stator body are co-axially installed;
   wherein the rotor electrodes are directly facing the stator electrodes with a space δ therebetween, so as to form a coupled capacitor;
   wherein when the rotor body rotates relative to the stator body;
   wherein a channel of traveling wave signal Uo is generated at the rotor electrodes;
   wherein the channel of traveling wave signal and a channel of reference signal Ur with the same frequency and fixed phase undergo a shaping process through a shaping circuit and a phase comparison process through a phase comparison circuit, a phase difference between the foregoing two channels of signals is represented by the number of interpolated high frequency clock pulse, which then undergoes a scale transformation, so as to obtain the angular displacement of the rotor body relative to the stator body,
   wherein a shape of each rotor electrode is a double sinusoidal shape formed by two vertically symmetrical sinusoidal shapes when spread along a circumferential direction, two neighboring rotor electrodes are connected via a lead, a length of each rotor electrode is slightly shorter than a length of each stator electrode, a width of each rotor electrode is equal to a sum of a width of each stator electrode and an insulation space thereof, and the space between two neighboring rotor electrodes is equal to 3 times the width of each rotor electrode.

2. The electric field type time grating angular displacement sensor as set forth in claim 1, wherein the stator electrodes are in an annular sector shape or curved surface rectangular shape, the stator electrodes are in the same size, and two neighboring electrodes have been maintained with an insulation distance there between.

3. The electric field type time-grating angular displacement sensor as set forth in claim 1, wherein a shape of each rotor electrode is formed along a circumferential direction, the shape comprising a first area defined by a sine curve over the range $[0, \pi]$, and a second area defined by a sine curve over the range $[\pi, 2\pi(]$, wherein the first area and the second area are symmetric about the circumferential direction to form an elongated electrode.

4. The electric field type time-grating angular displacement sensor as set forth in claim 1 wherein: a surface of the stator body is sequentially covered by four layers of medium films, wherein the first layer is a metal film, which are processed into four excitation signal leads, and the four excitation signal leads connect each one of the corresponding stator electrodes of the four excitation groups A, B, C and D into one group; the second layer is an insulation film; the third layer is a metal layer, which are processed into stator electrodes; and the fourth layer is an insulation protection film; the four excitation signal leads are routed below the middle of the stator electrodes, and the area of the four excitation signal leads of the stator electrodes can be completely covered by the facing leads of the rotor electrodes.

5. The electric field type time-grating angular displacement sensor as set forth in claim 1 wherein the rotor body and the stator body adopt the form of cylinder or cylindrical ring, and the upper and lower end surfaces of the cylinder or the outer and inner surfaces of the cylindrical ring are used to dispose the electrodes.

6. The electric field type time-grating angular displacement sensor as set forth in claim 1 wherein: group A of the stator electrodes and the corresponding rotor electrodes form a coupled capacitor C1; the electrodes of the excitation group B and the corresponding rotor electrodes form a coupled capacitor C2; the electrodes of the excitation group C and the corresponding rotor electrodes form a coupled capacitor C3; and the electrodes of the excitation group D and the corresponding rotor electrodes form a coupled capacitor C4; two members and the other two members of the four coupled capacitors C1, C2, C3, and C4 work in an alternative way to form a coupling channel of the alternating electric field; and the rotor electrodes output a traveling wave signal Uo.

* * * * *